United States Patent [19]
Yano et al.

[11] Patent Number: 5,231,431
[45] Date of Patent: Jul. 27, 1993

[54] PROJECTION TYPE DISPLAY APPARATUS

[75] Inventors: Koutaro Yano, Yokohama; Nozomu Kitagishi, Hachioji, both of Japan

[73] Assignee: Canon Kabushiki Kaisha, Tokyo, Japan

[21] Appl. No.: 619,514

[22] Filed: Nov. 29, 1990

[30] Foreign Application Priority Data

Nov. 29, 1989 [JP] Japan ................................. 1-311117
Feb. 6, 1990 [JP] Japan ................................. 2-027660

[51] Int. Cl.⁵ .............................................. G03B 21/28
[52] U.S. Cl. ....................................... 353/31; 353/37; 353/34; 353/69; 359/40
[58] Field of Search ...................... 353/31, 33, 34, 37, 353/30, 69, 81, 82, 94; 359/40, 41

[56] References Cited

U.S. PATENT DOCUMENTS 4,864,390 9/1989 McKechnie et al. .
4,909,601 3/1990 Yajima et al. .
4,981,352 1/1991 Tejima et al. .

FOREIGN PATENT DOCUMENTS 0243014 9/1989 Japan .
0243015 9/1989 Japan .

Primary Examiner—William A. Cuchlinski, Jr.
Assistant Examiner—William C. Dowling
Attorney, Agent, or Firm—Fitzpatrick, Cella, Harper & Scinto

[57] ABSTRACT

This specification discloses a projection type display apparatus in which the lights of a plurality of display means forming images of different color component lights are reflected by or transmitted through a dichroic mirror to effect color synthesis and the synthesized lights are projected onto a screen by a projection lens. The astigmatism created by the lights being transmitted through the obliquely disposed dichroic mirror is suppressed to thereby obtain a good quality of image.

20 Claims, 9 Drawing Sheets

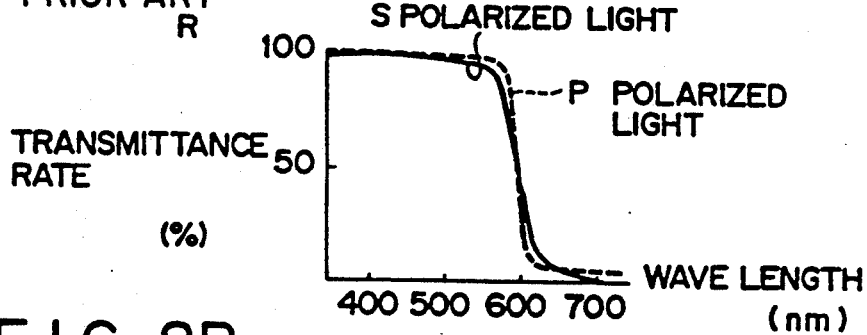
FIG. 8A PRIOR ART R
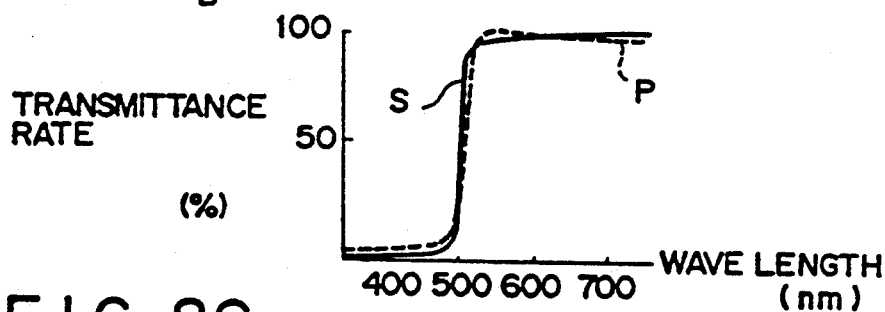
FIG. 8B PRIOR ART B
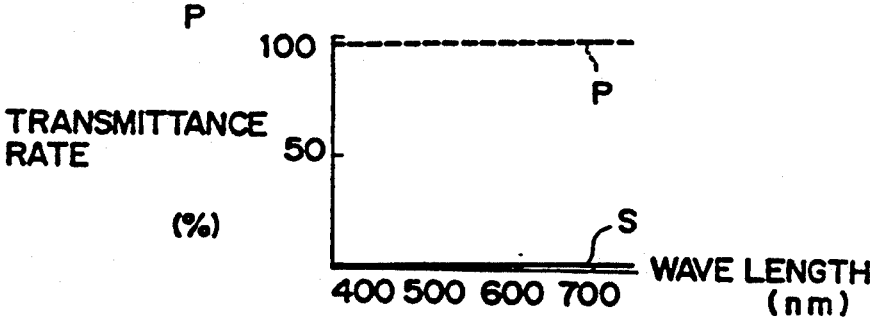
FIG. 8C PRIOR ART P

PROJECTION TYPE DISPLAY APPARATUS

BACKGROUND

Field of the Invention

This invention relates to a projection type display apparatus for color-projecting the image of a liquid crystal display element.

Related Background Art

As a color projection type display apparatus using liquid crystal display elements, there is known one in which light from a light source is divided into red, green and blue color lights by a color resolving system, the color lights are caused to enter the respective liquid crystal display elements to form images, the colors are synthesized by a color synthesizing system and a color image is obtained on a screen by means of a projection lens.

An example of such display apparatus is shown in FIG. 5 of the accompanying drawings.

The reference numeral 1 designates a light source such as a metal halide lamp, the reference numeral 2 denotes a reflector for reflecting light emitted from the light source 1, the reference numeral 3 designates a lens for making the reflected light from the reflector 2 into substantially parallel light, and the reference numeral 4 denotes a heat filter absorbing the infrared light of the source light which causes humidity rise. These together constitute the illuminating optical system of the projection type display apparatus. The reference numeral 7 designates a projection lens mounted so that the optic axis thereof may be orthogonal to the optic axis of the illuminating optical system.

The light which has left the illuminating optical system is color-resolved by dichroic mirrors 6a and 6c, and red light (R), green light (G) and blue light (B) illuminate liquid crystal display elements 5R, 5G and 5B, respectively. Further, these lights are modulated by the liquid crystal display elements 5R, 5G and 5B and two-dimensional images are formed and are again color-synthesized by dichroic mirrors 6b and 6d and are projected as a color image on a screen, not shown, by the projection lens 7.

In the above-described prior-art construction, however, for example, the dichroic mirrors 6b and 6d are obliquely disposed in the optical paths of red light component and blue light component, respectively, and this has led to the disadvantage that astigmatism occurs, for example, on the axis and the optical performance on the screen is remarkably reduced.

SUMMARY OF THE INVENTION

In view of such a problem, the present invention intends to provide a projection type display apparatus which can obtain a good color image.

BRIEF DESCRIPTION OF THE DRAWINGS

FIGS. 8A–8C are graphs showing the light dividing characteristics of surfaces R, B and P shown in FIG. 7.

DETAILED DESCRIPTION OF THE PREFERRED EMBODIMENTS

Some embodiments of the present invention will hereinafter be described.

Figure 1A:
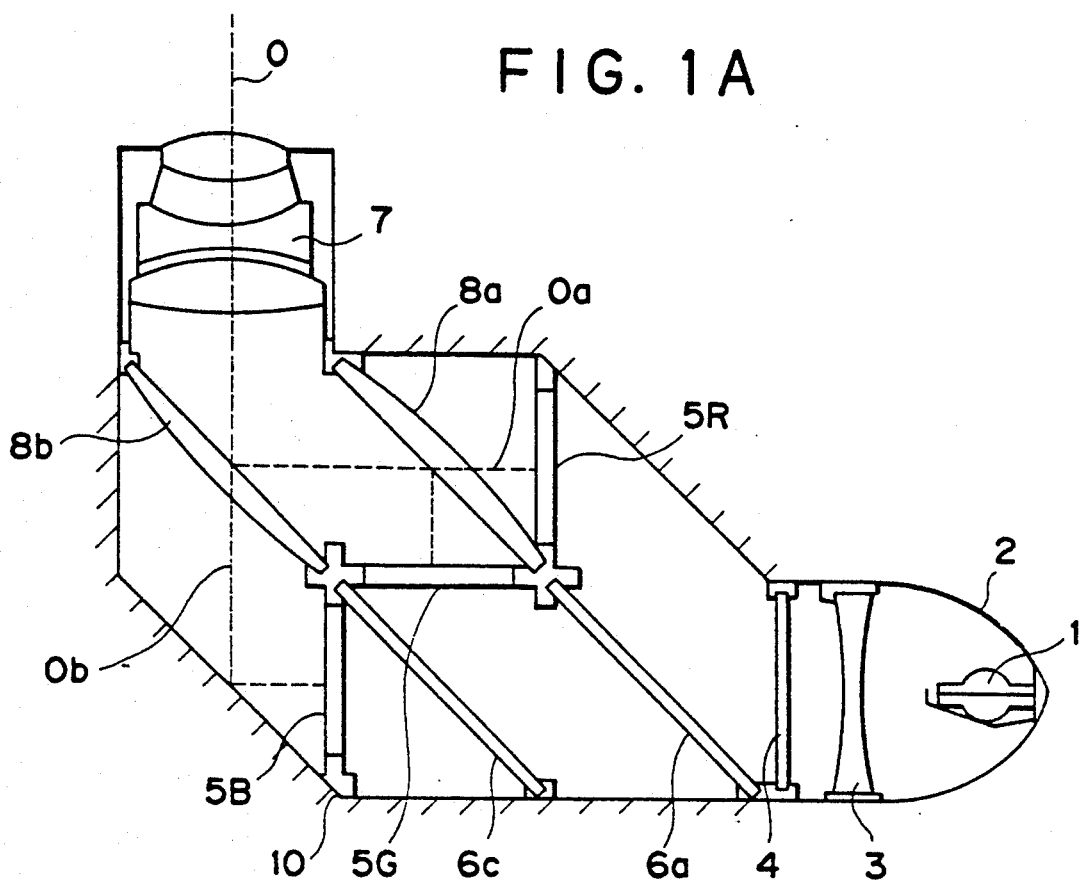
FIGS. 1A and 1B are cross-sectional views of a projection type display apparatus according to a first embodiment of the present invention.
Figure 5:
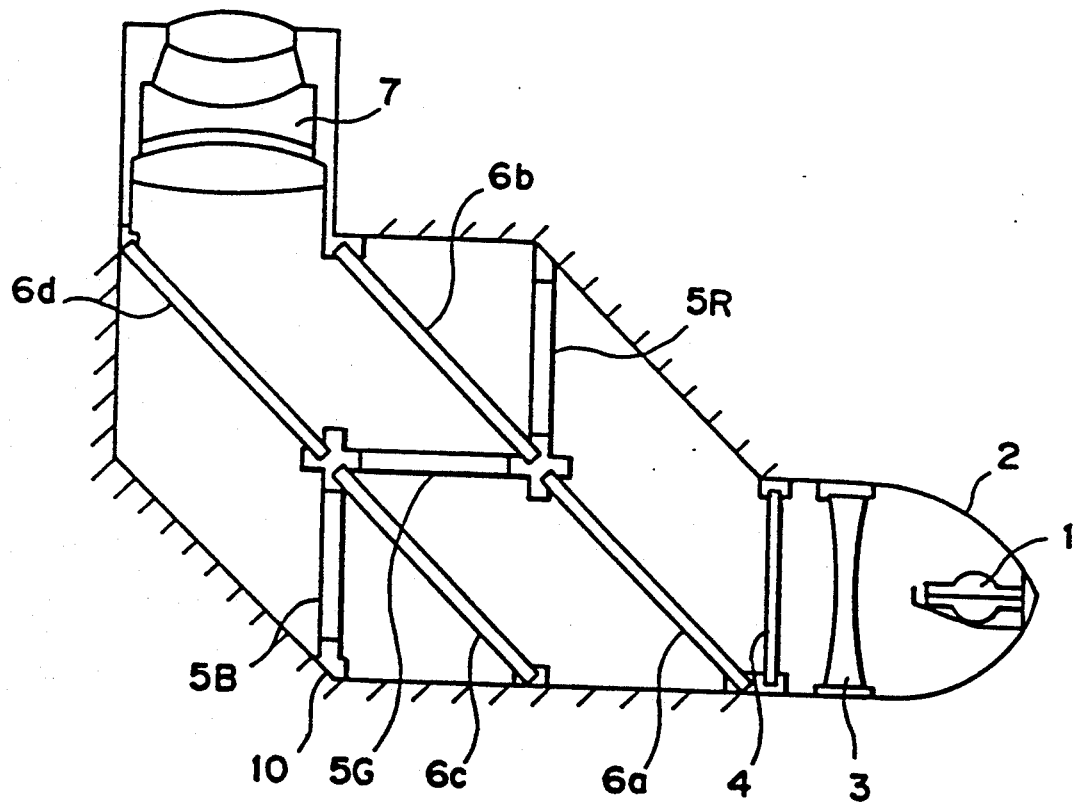
FIG. 5 is a cross-sectional view of a projection type display apparatus according to the prior art.

FIG. 1 is a cross-sectional view of a projection type display apparatus according to the present invention. In FIG. 1, portions designated by the same reference characters as those in FIG. 5; which shows an example of the prior art, are functionally similar to those shown in FIG. 5. The reference characters 8a and 8b designate cylindrical correcting optical systems having a dichroic mirror (film) formed on one surface of each thereof and having optical power on the other surfaces thereof. These correcting optical systems are endowed with optical power for offsetting astigmatism in the over direction occurring in the dichroic mirrors comprising obliquely disposed conventional parallel flat plates as previously described.

That is, image light modulated by transmission type liquid crystal display elements 5R and 5B is such that when it is transmitted through the conventional dichroic mirrors, astigmatism occurs on a screen in the over direction, but in the present embodiment, the surface which is not formed with dichroic film is made into a cylindrical surface and an optical action is imparted to a light beam passing through a predetermined surface to cause astigmatism on the axis to occur in the under direction, thereby suppressing the occurrence of astigmatism as a whole. The reason why the surface formed with the dichroic film is not endowed with optical power is for preventing any influence from being exerted upon the color light reflected by this dichroic film (the light modulated by a liquid crystal display element 5G).

Figure 1B:
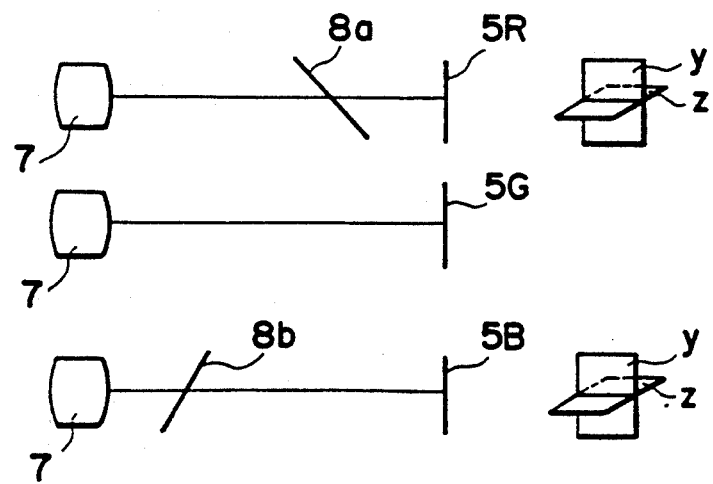

Description will now be specifically made of the direction in which the preferable optical power of the refractive power of the correcting optical systems is given. FIG. 1B is a view showing the optical paths shown in FIG. 1A as they are developed. First, a plane containing the optic axis of a projection lens 7 and the inclined lines of the dichroic mirrors is defined as Y plane, and a plane orthogonal to said Y plane and containing the optic axis of the projection lens 7 is defined as Z plane. As previously described, the color components modulated by the transmission type liquid crystal elements 5R and 5B pass through the dichroic mirrors 8a and 8b and are projected onto the screen through the projection lens 7, and among the color lights from the transmission type liquid crystal display elements 5R and 5B, the light beam in the Y plane and the light beam in the Z plane suffer from astigmatism occurring on the optic axis because the lengths of the optical paths by the obliquely disposed dichroic mirrors 8a and 8b differ from each other.

In contrast, in the present embodiment, a cylindrical lens surface whose cross-section in the Y plane has a positive curvature is made integral with a dichroic mirror, whereby astigmatism in the direction opposite to the above-described astigmatism is caused to occur, thereby balancing the two astigmatisms with each other.

In this manner, the color lights of the transmission type liquid crystal display elements 5R and 5B are aberration-corrected and are therefore made substantially equivalent to the color light which is not transmitted through the obliquely disposed dichroic mirror of the transmission type liquid crystal display element 5G, whereby it becomes possible to obtain a synthesized color image having a good optical performance.

In the present embodiment, use is made of cylindrical correcting optical systems whose cross-sectional shape in the Y plane is convex, but instead thereof, a cylindrical shape whose cross-section in the Z plane has negative refractive power will likewise enable astigmatism to be corrected in the under direction.

Further, the surface which is not formed with the dichroic film may be made into a toric surface to thereby make the refractive powers in the Y plane and the Z plane differ from each other.

In any case, when the refractive power in the cross-section in the Z plane of the present embodiment is $\psi_1$ and the refractive power in the cross-section in the Y plane is $\psi_2$, efficient correction of astigmatism becomes easy by satisfying the following condition:

$$\psi_1 < \psi_2. \tag{1}$$

However, although the above-mentioned condition is a condition for correcting astigmatism very well, even a spherical surface would enable a certain degree of astigmatism to be corrected if the cost and the ease of manufacture are taken into account.

It is desirable that the powers of the correcting optical systems disposed in the blue component light and the red component light be made considerably weak to keep conformity with the green light which provides the reference, and for example, in terms of focal length, |1000 mm | or greater is preferable.

Figure 2:
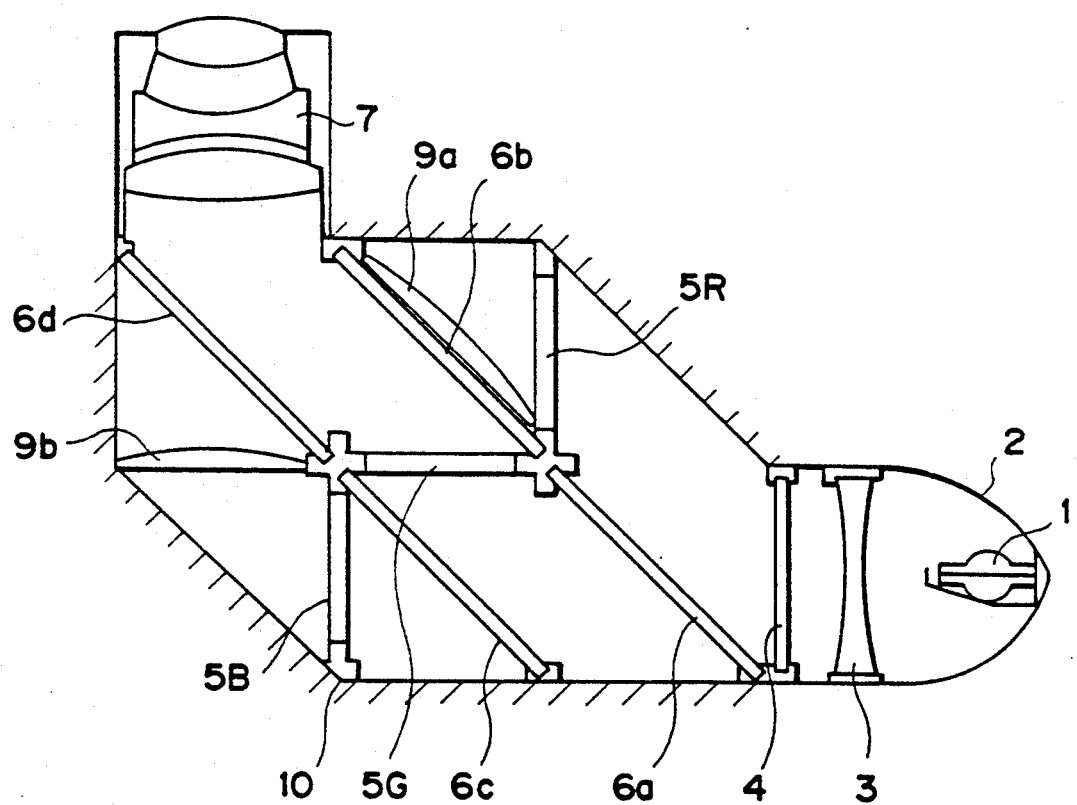
FIG. 2 is a cross-sectional view of a projection type display apparatus according to a second embodiment of the present invention.

FIG. 2 is a cross-sectional view of a projection type display apparatus according to a second embodiment of the present invention. In the present embodiment, a cylindrical lens 9a having positive refractive power with respect to the cross-section in the Y plane is disposed between a transmission type liquid crystal display element 5R and a dichroic mirror 6b and in proximity to and in parallelism to the dichroic mirror 6b, and on the other hand, a cylindrical lens 9b having positive refractive power with respect to the cross-section in the Y plane is disposed between a transmission type liquid crystal display element 5B and a dichroic mirror 6d so that the optic axis thereof may coincide with the optic axis of a projection lens 7. The cylindrical lenses 9a and 9b create astigmatism in the under direction in the cross-section in the Y plane relative to the cross-section in the Z plane of transmitted light and therefore have the function of offsetting and correcting the over astigmatism created by the dichroic mirrors 6b and 6d. Again in this case, the aforementioned condition (1), i.e., the relation between the refractive powers with respect to the cross-sections in the Z plane and the Y plane, can be satisfied.

Also, in the present embodiment, the cylindrical lenses are made convex so as to have positive refractive power in the cross-section with respect to the Y plane, but alternatively, use may of course be made of concave cylindrical lenses having negative refractive power in the cross-section with respect to the Z plane, or toric lenses. Further, in the above-described embodiments, use is made of optical elements having a predetermined curvature, but for example, a parallel flat plate inclined in twisted positional relationship with the dichroic mirror 6d can be used instead of the cylindrical lens 9b to thereby correct astigmatism likewise While in the above-described embodiments, transmission type liquid crystal display elements are used as image forming means, CRTs (cathode ray tubes) may safely be used.

As described above, according to the present invention, the occurrence of astigmatism during the transmission through the dichroic mirrors can be suppressed and therefore, an image having a high optical performance can be obtained on the screen.

Description will now be made of another embodiment of the present invention in which the occurrence of astigmatism in another optical system is suppressed.

Figure 6:
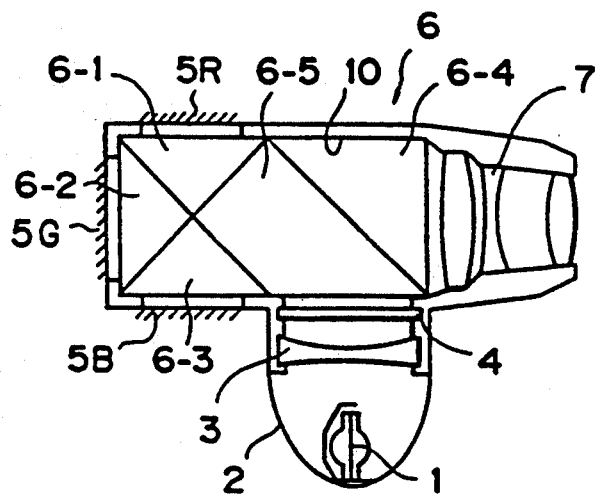
FIG. 6 is a schematic view showing a projection type display apparatus which forms the basis of the present invention.

FIG. 6 shows the construction of a projection type display apparatus which is the basis of the present invention. This apparatus is one disclosed in Japanese Patent Application No. 1-222413 by the applicant. The reference numeral 1 designates a light source such as a metal halide lamp, the reference numeral 2 denotes a reflector for reflecting light emitted from the light source 1, the reference numeral 3 designates a lens for making the reflected light from the reflector 2 into substantially parallel light, the reference numeral 4 denotes a heat filter for absorbing the infrared light of the source light, the reference characters 5R, 5G and 5B designate reflection type liquid crystal display elements driven by a liquid crystal driving circuit (not shown) in response to an extraneous image signal input, the reference numeral 6 denotes a dichroic polarizing prism for directing the S polarized component of the source light to the liquid crystal display elements 5R, 5G and 5B and dividing it into red light, green light and blue light, and the reference numeral 7 designates a projection lens.

Figure 7:
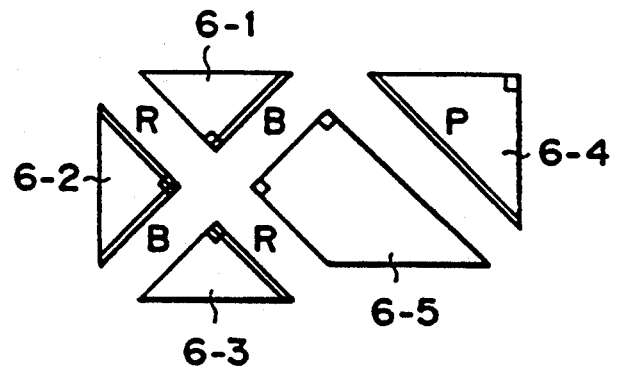
FIG. 7 is an illustration showing the specific construction of a prism 6 shown in FIG. 6.

The dichroic polarizing prism 6, as shown in FIG. 7, is comprised of triangular prisms 6-1, 6-2, 6-3 and 6-4 and a trapezoidal prism 6-5, and surfaces designated by R, B and P in FIG. 7 are provided with thin coatings having spectral and polarization transmittance characteristics indicated by R, B and P, respectively, in FIG. 8.

The light emitted from the light source 1 is made into substantially parallel light by the reflector 2 and the lens 3, and the infrared light (light having a wavelength of about 700 nm or more) thereof is absorbed by the heat filter 4. Further, the P polarized component of the source light is transmitted through the cemented prism surface P and absorbed by a light-intercepting surface 10, while the S polarized component of the source light is reflected by the cemented prism surface P and the red light (light having a wavelength greater than about 600 nm and less than 700 nm) thereof is reflected by the cemented prism surface R and enters the liquid crystal element 5R.

Also, the blue light (light having a wavelength of about 500 nm or more) is reflected by the cemented prism surface B and enters the liquid crystal display element 5B.

Further, the green light (light having a wavelength greater than about 500 nm and less than 600 nm) is transmitted through the cemented prism surface R and the cemented prism surface B and enters the liquid crystal display element 5G. The respective color lights are deflected and modulated by the liquid crystal display elements 5R, 5G and 5B and are reflected thereby, and are color-synthesized by the cemented prism surfaces, and the P polarized component thereof arrives at the projection lens 7, while the S polarized component thereof is reflected by the cemented prism surface P and returns to the light source 1.

Accordingly, of the source light, the S polarized component is modulated by the liquid crystal display element and only the P polarized component arrives at the projection lens 7 and is projected onto a screen, not shown. The projection type display apparatus described above with reference to FIGS. 6 to 8 is a compact apparatus in which the optical system is simple and excellent. In this apparatus, however, the prism 6 comprising a plurality of prisms 6-1 to 6-5 cemented together is used as the optical system for color resolution and color synthesis and therefore, it is not easy to make the apparatus light in weight.

Figure 9:
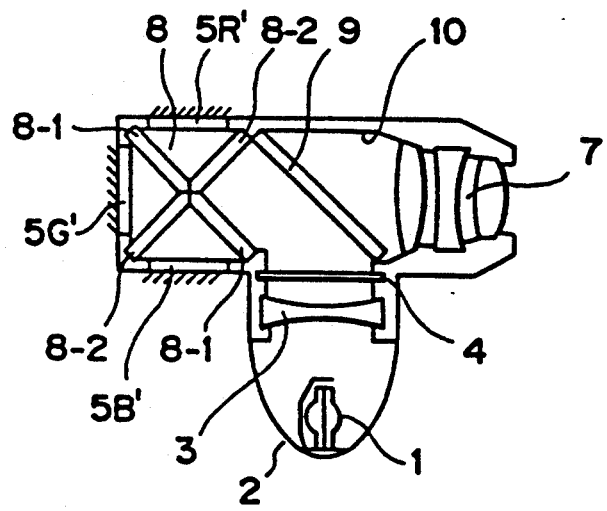
FIG. 9 is a schematic view showing a modification of the apparatus shown in FIG. 6.

As a measure for making the apparatus light in weight, there would occur to mind the construction shown in FIG. 9, i.e., a construction in which plate-like dichroic mirrors 8-1 and 8-2 are used instead of the prisms 6-1 to 6-3 of FIG. 6, a half mirror 9 is used in place of the prism 6-4 of FIG. 6 and the prism 6-5 of FIG. 6 is not used. With such a construction, it becomes unnecessary to form the optical system by block-like members such as prisms and the optical system can be made light in weight. In FIG. 9, the reference characters 5R', 5G' and 5B' designate reflection type liquid crcrystal display elements each provided with a polarizing plate and the reference numeral 8 denotes a color resolving-color synthesizing optical system provided with each two mirrors 8-1 and 8-2.

Now, it has already been described that as shown in FIG. 9, the dichroic mirrors 8-1 and 8-2 are used, whereby the optical system and thus, the apparatus can be made light in weight, but here arises a problem. The problem is that astigmatism created by the dichroic mirrors 8-1 and 8-2 disposed obliquely with respect to the optic axis of the projection lens 7 deteriorates the quality of the image projected onto the screen by the projection lens 7.

The present invention provides an apparatus in which such deterioration of the quality of the image can be suppressed and the optical system can be made compact and light in weight, and an embodiment thereof will hereinafter be described in detail.

Figure 3A:
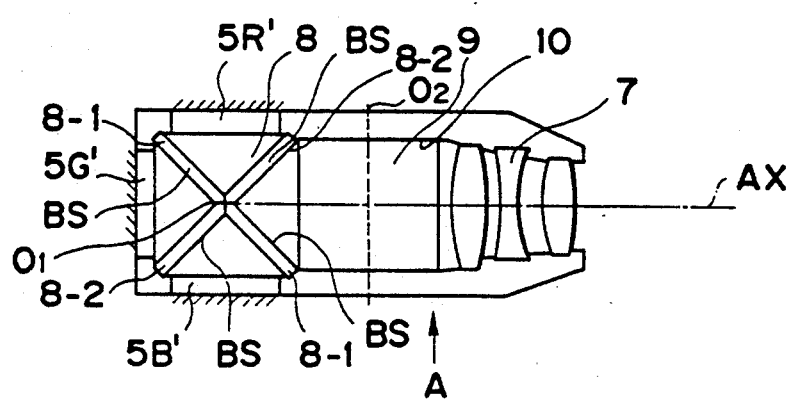
FIGS. 3A, 3B and 3C are schematic views showing an embodiment of the present invention.
Figure 3B:
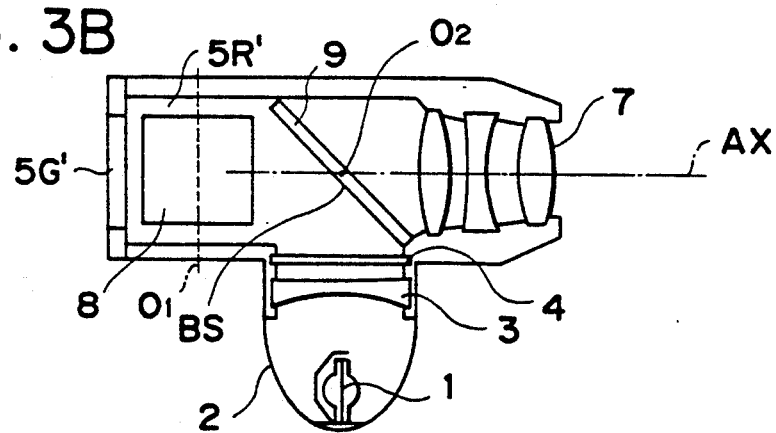

FIGS. 3A and 3B are schematic views showing an embodiment of the present invention, FIG. 3B being a view of the apparatus of FIG. 3A as it is seen in the direction of arrow A. In FIGS. 3A and 3B, members already shown in FIG. 6 are given the same reference characters as those in FIG. 6 and need not be described here in detail. In FIGS. 3A and 3B, a color resolving-color synthesizing optical system 8 is comprised of four mirrors, i.e., two plate-like dichroic mirrors 8-1 and two plate-like dichroic mirrors 8-2. These four mirrors 8-1 and 8-2 have their end portions coupled together so that their light dividing surfaces BS may form an angle of 90° with respect to each other, and form a cross. Accordingly, the optical system 8 will hereinafter be referred to as the cross dichroic mirror. The dichroic mirrors 8-1 reflect the red light component and transmit the other color components therethrough, and the dichroic mirrors 8-2 reflect the blue light component and transmit the other color components therethrough.

Figure 4A:
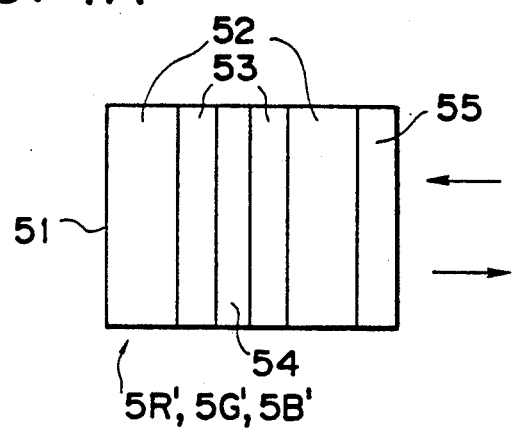
FIGS. 4A and 4B are cross-sectional views showing an example of a liquid crystal display element.

The reference characters 5R', 5G' and 5B' designate reflection type liquid crystal display elements The construction of these elements 5R', 5G' and 5B' is as shown in FIG. 4A. In FIG. 4A, the reference numeral 51 denotes a mirror, the reference numeral 52 designates a pair of glass substrates, the reference numeral 53 denotes a transparent electrodes, the reference numeral 54 designates a liquid crystal layer, and the reference numeral 55 denotes a polarizing plate. The transparent electrodes 53 are formed on the opposed surfaces of the pair of substrates 52, and the liquid crystal layer 54 is sandwiched between the transparent electrodes 53 of the substrates 52, and the polarizing plate is attached to that surface of one substrate 52 which is opposite to the surface on which the transparent electrode is formed, and the mirror is formed on that surface of the other substrate 52 which is opposite to the surface on which the transparent electrode is formed. The light (from the cross dichroic mirror 8) enters the element from the polarizing plate 55 side, enters the mirror 51 through the liquid crystal layer 54, is reflected by the mirror 51, and again passes through the liquid crystal layer 54 to the polarizing plate 55.

A liquid crystal driving circuit, not shown, applies a voltage to the transparent electrodes 53 in conformity with image information to be displayed, and causes an electric field to act on the liquid crystal layer 54. By the action of this electric field, the oriented state of the liquid crystal molecules of the liquid crystal layer 54 is changed to thereby change the polarized state of the light passing through the liquid crystal layer 54. Accordingly, through the liquid crystal driving circuit, the light having entered the element can be caused to emerge again from the element, and the light having entered the element can be intercepted so as to not to emerge again from the element, by the actions of the liquid crystal layer 54 and the polarizing plate 55, and the intensity of said light can be modulated. Thus, modulated light can be supplied from the element in conformity with image information.

Figure 3C:
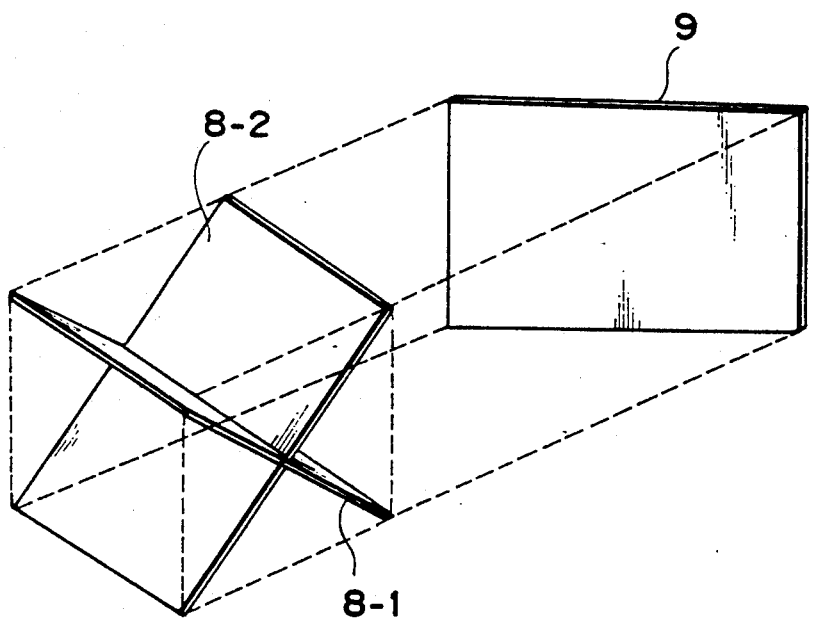

Turning back to FIGS. 3A and 3B, the reference numeral 9 designates a half mirror comprising a glass substrate and several layers of dielectric material film laminated thereon. The half mirror 9 is obliquely disposed so that the light dividing surface BS thereof forms 45° with respect to the optic axis AX of the projection lens 7. The half mirror 9 is such that the axis $O_2$ thereof is twisted at a right angle with respect to the common axis $O_1$ of the cross dichroic mirror 8, that is, the surface of the half mirror is in twisted relationship with each surface of the cross dichroic mirror 8. That is, the light dividing surface BS of the half mirror 9 is set so as to become rotated by 90° about the optic axis AX of the projection lens 7 from the state of FIG. 9. FIG. 3C shows a single view drawing. The relationship between these surfaces is called the twisted relationship herein. The refractive index and thickness of the glass substrate of the half mirror 9 and the angle of inclination of the glass substrate with respect to the optic axis are determined so as to correct astigmatism occurring in the cross dichroic mirror 8.

The light emitted from the light source 1 is reflected by the reflector 2, whereafter it is converted into substantially parallel light by the lens 3 and infrared light is absorbed by the heat filter 4. The light from the light source 1 is further reflected by the half mirror 9 and is directed to the dichroic mirrors 8-1 and 8-2, and the red light component thereof is reflected by the dichroic mirror 8-1 and enters the liquid crystal display element 5R', and the blue light component thereof is reflected by the dichroic mirror 8-2 and enters the liquid crystal display element 5B', and the green light component thereof is transmitted through both of the dichroic mirrors 8-1 and 8-2 and enters the liquid crystal display element 5G'

Here, for example, the green light which has entered the reflection type liquid crystal display element 5G', as described with reference to FIG. 5A, has only its polarized component in one direction transmitted through the polarizing plate 55 and enters the substrate 52, and is directed to the liquid crystal layer 54 through the substrate 52. This light is subjected to polarization and modulation by the liquid crystal layer 54, is reflected by the mirror 51 and travels back along the original optical path, and only its polarized component in one direction emerges through the polarizing plate 55. The green light image formed at this time is transmitted through the dichroic mirrors 8-1 and 8-2 and the half mirror 9, and is projected onto a screen, not shown, by the projection lens 7. At this time, astigmatism is created on the axis by the green light being transmitted through the dichroic mirrors 8-1 and 8-2, but the astigmatism on the axis created by the dichroic mirrors 8-1 and 8-2 is corrected by the half mirror 9 because as previously described, the half mirror 9 is disposed with an inclination with respect to the optic axis AX so that the inclined axis thereof may be orthogonal to the dichroic mirrors 8-1 and 8-2. In the red light and the blue light as well, the astigmatism on the axis is likewise corrected and therefore, a color image of good quality can be obtained on the screen.

In the apparatus of the present embodiment, the cross dichroic mirror 8 constitutes a color resolving-color synthesizing optical system and the half mirror 9 is obliquely disposed between the mirror 8 and the projection lens 7 so that the illumination and the projection of image may be effected through the half mirror 9 and therefore, the optical system is simple and compact and light in weight. Further, the half mirror 9 in installed so that the astigmatism created by the cross dichroic mirror 8 may be corrected by the half mirror 9 and therefore, the image projected onto the screen is good in quality and thus, there can be provided an excellent projection type display apparatus.

Figure 4B:
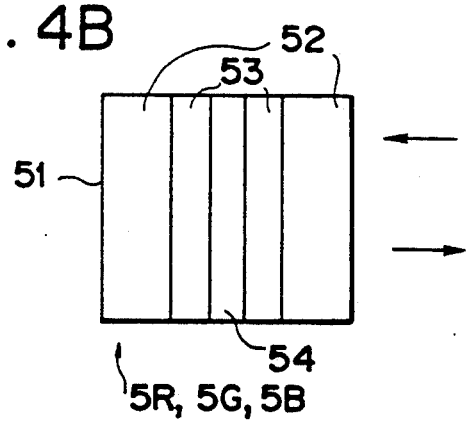

In the apparatus shown in FIGS. 3A and 3B, as the reflection type liquid crystal display elements 5R', 5G' and 5B', use is made of ones shown in FIG. 4A, but alternatively, as these elements, use can be made of ones shown in FIG. 4B. The element shown in FIG. 4B is the reflection type liquid crystal display element used in the projection type display apparatus described with reference to FIG. 6, and the difference of the element shown in FIG. 4B from the element shown in FIG. 4A is that no polarizing plate is provided. Where such an element is used in the apparatus of the present invention, as in the prism 6-4 shown in FIG. 7, a polarizing beam splitter P may preferably be used instead of the half mirror 9 of FIGS. 3A and 3B. The polarizing beam splitter can be constructed simply by forming polarizing separation film on that surface of the glass substrate of the mirror 9 shown in FIGS. 3A and 3B which is adjacent to the cross dichroic mirror 8. Accordingly, the number of optical systems is scarcely increased.

Also, the embodiments described above are ones in which reflection type elements are used as the liquid crystal elements for image display, but alternatively, transmission type elements can be used.

As described above, according to the present invention, there can be provided an excellent projection type display apparatus which is compact and light in weight and moreover can project images of good quality onto a screen.

What is claimed is:

1. A projection type display apparatus including:
    a plurality of display means for displaying images of different color component lights;
    a dichroic mirror for synthesizing the color component lights of said display means;
    projection lens means for projecting the lights synthesized by said dichroic mirror; and
    correcting optical means disposed between at least one of said display means and said projection lens means for suppressing astigmatism created by said dichroic mirror.

2. A projection type display apparatus according to claim 1, wherein said correcting optical means is located between said at least one display means and said dichroic mirror.

3. A projection type display apparatus according to claim 2, wherein optical power in a first optical cross-section of said correcting optical means and optical power in a second optical cross-section orthogonal to the first cross-section differ from each other.

4. A projection type display apparatus according to claim 3, wherein said correcting optical means has a cylindrical lens surface.

5. A projection type display apparatus according to claim 4, wherein said correcting optical means and said dichroic mirror are integral with each 6. A projection type display apparatus according to claim 3, wherein said correcting optical means has a toric lens surface.

7. A projection type display apparatus according to claim 6, wherein said correcting optical means and said dichroic mirror are integral with each other.

8. A projection type display apparatus according to claim 2, wherein said dichroic mirror transmits therethrough the color component light of a first one of said display means and reflects the color component light of a second one of said display means, thereby synthesizing the color component lights, and a second dichroic mirror reflects the syntheisized lights and transmits therethrough the color component light of a third one of said display means, thereby synthesizing the color component lights, and directs the synthesized lights to said projection lens means.

9. A projection type display apparatus according to claim 8, wherein said correcting optical means is located on the light transmitting surface side of each of said dichroic mirrors.

10. A projection type display apparatus according to claim 9, wherein optical power in a first optical cross-section of each of said correcting optical means and optical power in a second optical cross-section orthogonal to the first cross-section differ from each other.

11. A projection type display apparatus according to claim 10, wherein said correcting optical means have a cylindrical lens surface.

12. A projection type display apparatus according to claim 10, wherein each of said correcting optical means is integral with a corresponding one of said dichroic mirrors.

13. A projection type display apparatus according to claim 1, wherein said correcting optical means is located between said dichroic mirror and said projection lens means.

14. A projection type display apparatus according to claim 13, wherein said correcting optical means includes a transmitting surface which is positioned in an angular relationship with the surface of said dichroic mirror.

15. A projection type display apparatus, comprising:
at least first and second display means for displaying images of different color component lights;
a first optical member for reflecting the color component light of said first display means and transmitting therethrough the color component light of said second display means to synthesize the color component lights, said first optical member having a first side adjacent said second display means;
projection lens means, having an optical axis, for projecting the color component lights synthesized by said first optical member; and
a second optical member having predetermined optical power provided adjacent the first side of said first optical member and between said first optical member and said second display means, with said second optical member including a lens surface inclined to the optical axis of said projection lens means, wherein
said second optical member includes a cylindrical lens surface and first and second optical members are integral with each other.

16. A projection type display apparatus, comprising:
at least first and second display means for displaying images of different color component lights;
a first optical member for reflecting the color component light of said first display means and transmitting therethrough the color component light of said second display means to synthesize the color component lights, said first optical member having a first side adjacent said second display means;
projection lens means, having an optical axis, for projecting the color component lights synthesized by said first optical member; and
a second optical member having predetermined optical power provided adjacent the first side of said first optical member and between said first optical member and said second display means, with said second optical member including a lens surface inclined to the optical axis of said projection lens means, wherein
said second optical member has a toric lens surface.

17. A projection type display apparatus according to claim 16, wherein said first and second optical members are integral with each other.

18. A projection type display apparatus comprising:
first, second and third display means for displaying images of different color component lights;
a projection lens having an optic axis;
first and second dichroic mirrors disposed obliquely with respect to said optic axis and having surfaces orthogonal to each other, said first dichroic mirror reflecting the light of said first display means, said second dichroic mirror reflecting the light of said third display means, said first and second dichroic mirrors transmitting therethrough the light of said second display means, for synthesizing and directing said color component lights to said projection lens; and
a half-mirror located between said projection lens and said first and second dichroic mirrors and having a surface which is positioned in an angular relationship with said surfaces of said first and second dichroic mirrors.

19. A projection type display apparatus according to claim 18, further comprising a light source and wherein said half-mirror reflects the light of said light source to said first and second dichroic mirrors to illuminate said display means.

20. A projection type display apparatus according to claim 18, wherein said half-mirror is located in a plane transverse to planes defined by said first and second dichroic mirrors.

* * * * *

UNITED STATES PATENT AND TRADEMARK OFFICE
CERTIFICATE OF CORRECTION

PATENT NO. : 5,231,431
DATED : July 27, 1993
INVENTOR(S) : Yano, et al.

It is certified that error appears in the above-indentified patent and that said Letters Patent is hereby corrected as shown below:

COLUMN 8:

Line 38, "each" should read --each other.--.

Signed and Sealed this

Thirtieth Day of July, 1996

Attest:

BRUCE LEHMAN

*Attesting Officer*  *Commissioner of Patents and Trademarks*